(12) United States Patent
Pettersson (10) Patent No.: US 11,833,909 B2
(45) Date of Patent: Dec. 5, 2023

(54) VEHICLE WITH DRIFT MODE

(71) Applicant: FORD GLOBAL TECHNOLOGIES, LLC, Dearborn, MI (US)

(72) Inventor: Lars Niklas Pettersson, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 627 days.

(21) Appl. No.: 17/023,575

(22) Filed: Sep. 17, 2020

(65) Prior Publication Data

US 2022/0080837 A1  Mar. 17, 2022

(51) Int. Cl.
| | | |
|---|---|---|
| *B60L 15/20* | (2006.01) | |
| *B60L 7/18* | (2006.01) | |
| *B60L 3/10* | (2006.01) | |
| *B60T 8/1755* | (2006.01) | |
| *B60W 30/09* | (2012.01) | |

(52) U.S. Cl.
CPC ............ *B60L 15/2036* (2013.01); *B60L 3/10* (2013.01); *B60L 7/18* (2013.01); *B60L 15/2009* (2013.01); *B60T 8/17551* (2013.01); *B60T 8/17552* (2013.01); *B60T 8/17558* (2013.01); *B60W 30/09* (2013.01); *B60T 2201/16* (2013.01)

(58) Field of Classification Search
CPC .................. B60T 8/17551; B60T 2201/16
USPC ................................................ 701/41
See application file for complete search history.

(56) References Cited

U.S. PATENT DOCUMENTS

| | | | |
|---|---|---|---|
| 9,296,424 B2 | 3/2016 | Cotgrove | |
| 10,272,925 B1 | 4/2019 | Wicks et al. | |
| 2004/0163860 A1* | 8/2004 | Matsuzaki | B60K 6/44 290/46 |
| 2014/0379220 A1* | 12/2014 | Lee | B60W 10/18 701/41 |
| 2016/0167662 A1* | 6/2016 | Kobayashi | B60W 40/068 701/90 |
| 2019/0176801 A1* | 6/2019 | Ruybal | B60K 6/52 |
| 2019/0337385 A1* | 11/2019 | Lim | B60K 23/0808 |
| 2021/0402877 A1* | 12/2021 | Velazquez Alcantar | B60W 30/18181 |

FOREIGN PATENT DOCUMENTS

KR   20180052983 A   5/2018

\* cited by examiner

*Primary Examiner* — Jacob S. Scott
*Assistant Examiner* — Michael E Butler
(74) *Attorney, Agent, or Firm* — David B Kelley; Brooks Kushman P.C.

(57) ABSTRACT

A vehicle includes driven wheels, an actuator operably coupled to the driven wheels by a drivetrain, and a braking system having friction brakes associated with the driven wheels. A controller is programmed to, in response to the vehicle being in a drift mode, decouple the driven wheels from the actuator, engage the friction brakes to lockup the driven wheels, and place the actuator in speed control and command a torque to the actuator based on a difference between a measured speed of the actuator and a target speed of the actuator.

18 Claims, 5 Drawing Sheets

VEHICLE WITH DRIFT MODE

TECHNICAL FIELD

This disclosure relates to vehicles and more specifically to vehicles having a drift mode.

BACKGROUND

Performance braking systems are typically implemented for vehicles that are engaged in drifting, e.g., track drifting or closed-course drifting. A vehicle may be placed into a drift by actuating a parking brake causing the rear wheels to lock up and slide at least partially sideways while navigating a turn for example. A vehicle may also be placed into a drift by providing excessive torque to the rear wheels causing a loss of traction between the tires and the road.

SUMMARY

According to one embodiment, a vehicle includes driven wheels, an actuator operably coupled to the driven wheels by a drivetrain, and a braking system having friction brakes associated with the driven wheels. A controller is programmed to, in response to the vehicle being in a drift mode, decouple the driven wheels from the actuator, engage the friction brakes to lockup the driven wheels, and place the actuator in speed control and command a torque to the actuator based on a difference between a measured speed of the actuator and a target speed of the actuator.

According to another embodiment, a vehicle includes an engine having a crankshaft, an electric machine having a shaft, a front end accessory drive (FEAD) having a tension member operably connecting the crankshaft and the shaft, a drivetrain operably coupling the engine to driven wheels, and a braking system having friction brakes associated the driven wheels. A controller is programmed to, in response to the vehicle being in a drift mode: actuate the drivetrain to decouple the driven wheels from the engine, engage the friction brakes to lockup the driven wheels, and, responsive to the driven wheels being decoupled from the engine, command a negative torque to the electric machine such that a speed of the engine is maintained during the decoupling.

According to yet another embodiment, a method of a vehicle drift mode includes receiving a request to activate drift mode; in response to the request, decoupling driven wheels from an actuator; in response to the decoupling, engaging friction brakes associated with the driven wheels such that the driven wheels become locked up; and, in response to the decoupling, controlling the actuator in speed control such that torque is commanded to the actuator based on a difference between a measured speed of the actuator and a target speed of the actuator.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A vehicle may include a drift mode in which the rear wheels are rotationally locked to induce a sideways movement of a rear end of the vehicle. The drift mode may be accomplished using a performance braking system. Performance driving, which may be associated with rally driving or track drifting, for example, usually requires a performance brake system that can require the addition of numerous components, which can be costly and/or involve significant labor based on complexity. In particular, hydraulic lines, cylinders and supporting equipment, all of which can involve significant expense and complexity, may need to be installed in a vehicle. Further, known performance brake systems are not integrated with control systems or other subsystems of a vehicle. In other words, these known braking systems operate independently of other modes and/or functions associated with the vehicle.

The examples disclosed herein enable integration of performance brakes (e.g., maneuvering brakes, drifting brakes, rally brakes, etc.) into vehicles by digitally communicatively coupling a maneuvering input device, which may be implemented as a lever or a button, for example, to a brake system, such as an anti-lock braking system (ABS) or a brake-by-wire system. As a result, highly responsive integrated performance brakes are enabled for performance maneuvering.

Some of the examples disclosed herein utilize a rotatable performance lever and a high-speed digital data interface to direct use of an ABS of a vehicle to significantly brake and/or lock at least one wheel of a vehicle during performance maneuvering. In some examples, the ABS is prevented from being controlled by the performance lever until numerous checks are successfully performed to prevent unintended operation of the performance lever.

In some examples, a clutch is disengaged when the ABS is controlled by the performance lever. In some examples, the ABS can only be controlled by the performance lever when the vehicle is in a selected mode (e.g., a track mode, a performance mode, a drift mode, a current selected mode, etc.).

As used herein, the terms "lock" or "locked" in the context of brakes, wheels and/or brake assemblies involves constraining at least one wheel of a vehicle such that rotation of the wheel is significantly reduced and/or the wheel does not rotate relative to the vehicle. As used herein, the terms "drifting" and "drift" refer to intentionally causing a vehicle to skid (e.g., skid sideways) during a driving maneuver (e.g., a closed track maneuver, a turning maneuver, etc.). As used herein, the term "performance brake" refers to a brake component, assembly and/or system that is used in racing or recreational maneuvering, such as drifting or rally racing, for example. Accordingly, as used herein, the term "performance lever" refers to a lever, stick or other similar input device used in conjunction with the aforementioned racing or recreational maneuvering. As used herein, the term "ABS" may refer to an ABS or any other braking control system, such as an electronic stability control (ESC) system, with ABS functionality.

Figure 1:
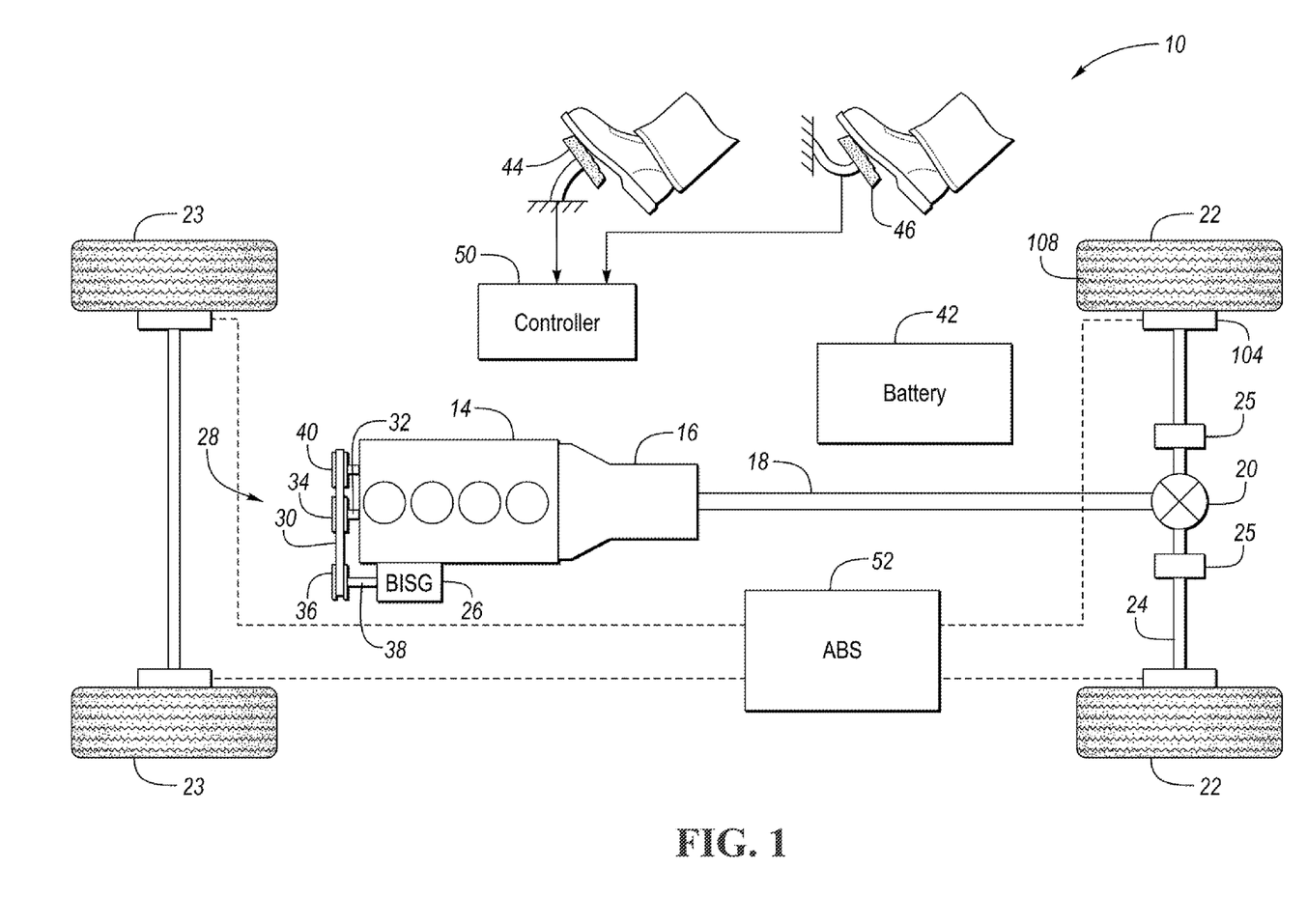
FIG. 1 is a diagrammatic view of a vehicle.

Referring to FIG. 1, a schematic diagram of a mild-hybrid electric vehicle (MHEV) 10 is illustrated according to an embodiment of the present disclosure. The vehicle 10 includes a powertrain 12. The powertrain 12 includes an actuator, e.g., engine 14, that powers a drivetrain 15. The drivetrain 15 may include a transmission 16, e.g., a multiple step-ratio transmission, a driveshaft, a differential 20, axles 24, clutches 25, and the like. The engine 14 may be an internal combustion engine fueled by gasoline, diesel, or natural gas, etc. The transmission may be an automatic or a manual. The engine 14 may be coupled to the engine via a clutch or a torque converter depending upon the type of transmission used. The output of the transmission 16 is coupled to the driveshaft 18 that transmits torque to the differential 20. The differential 20 distributes torque to the driven wheels 22 via shafts 24 when the clutches 25 are engaged. The example vehicle 10 is shown with as rear-wheel drive. The vehicle 10 also includes non-driven wheels 23, which may be front wheels. The clutches 25 which may be part of the differential 20 or separate components, are configured to selectively couple and decouple the driven wheels 22 from the upstream driveline. When the clutches 25 are engaged, the driven wheels 22 are rotationally locked with the drivetrain 15, and when the clutches 25 are disengaged, the driven wheels are independently rotatable relative to the driveline 15. An alternative embodiment, the clutches 25 may be provided at the wheel assemblies.

The powertrain 12 further includes an associated controller 50 such as a powertrain control module (PCM). While illustrated as one controller, the controller 50 may be part of a larger control system and may be controlled by various other controllers throughout the vehicle 10, such as a vehicle system controller (VSC). It should therefore be understood that the controller 50 and one or more other controllers can collectively be referred to as a "controller" that controls various actuators in response to signals from various sensors to control functions such as operating the engine 14, operating the transmission 16, an electric machine, the ABS 52, the clutches 25, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. The controller 50 may communicate signals to and/or from engine 14, the transmission 16, etc. Although not explicitly illustrated, those of ordinary skill in the art will recognize various functions or components that may be controlled by controller 50 within each of the subsystems identified above.

The vehicle 10 may include a BISG 26 (sometimes called a $P_0$ motor/generator) that is connected to the FEAD 28. The BISG 26 generally replaces the alternator. The BISG 26 is an electric machine configured to act as a motor or a generator. BISG 26 may be a three-phase electric motor. The FEAD 28 includes a tension member, e.g., a belt 30, that operably couples the BISG 26 to the crankshaft 32 of the engine 14. For example, the engine 14 includes an associated pulley 34 that is supported on the crankshaft 32 and the BISG 26 includes an associated pulley 36 that is supported on a shaft 38 of the BISG 26. (As will be described in detail below, one of the pulleys 34 and 36 are part of a multi-speed pulley assembly.) The shaft 38 may be fixed to the rotor of the BISG 26 and may be referred to as a rotor shaft. The belt 30 is trained over these pulleys so that torque can be transmitted between the engine 14 and the electric machine 26. One or more accessories may include pulleys, generally illustrated as pulley 0, that is also engaged with the belt 30, or with a second belt that connects to the crankshaft. That is, the FEAD may include a single belt or multiple belts. The FEAD 28 allows the accessories to be powered by the engine 14, the BISG 26, or combination thereof.

The BISG 26 is electrically connected to a battery 42. The battery 42 may be a high-voltage or a low-voltage battery. For example, the battery 42 and the BISG 26 may be part of a 12V, 48 V, 96 V, or 300 V electrical system. The BISG 26 may be connected to the battery 42 and other vehicle electrical systems though power electronics (not shown). The BISG 26 may be configured to operate as a motor to start the engine 14 during an engine start-up event, or to provide additional torque to the powertrain 12 during vehicle operations. The BISG 26 may also be configured to receiving torque from the engine 14 and operate as a generator to recharge the battery 42 and power electrical loads of the vehicle. The BISG 26 may further be configured to perform regenerative braking. The controller 50 may be configured to transmit signals to the BISG 26 to operate the BISG 26 as either a motor or a generator. The BISG 26 may be configured to provide electrical energy to charge the battery 72 or provide electrical energy to power the vehicle accessories when operating as a generator.

An accelerator pedal 44 is used by the driver of the vehicle to provide a demanded torque, power, or drive command (herein "driver-demanded torque") to propel the vehicle. In general, depressing and releasing the accelerator pedal 44 generates an accelerator-pedal position signal that may be interpreted by the controller 50 to determine the driver-demanded torque. A brake pedal 46 is also used by the driver of the vehicle to provide a demanded braking torque to slow the vehicle. In general, depressing and releasing the brake pedal 46 generates a brake-pedal position signal that may be interpreted by the controller 50 as a demand to decrease the vehicle speed. Based upon inputs from the accelerator pedal 44 and brake pedal 46, the controller 50 commands torque to the engine 14, the BISG 26, and friction brakes 104. The controller 50 is programmed to arbitrate the driver-demanded torque between the engine 14 and the BISG 26, and to arbitrate the braking torque between the regenerative braking via the BISG 26 and the friction brakes 104. This disclosure is also applicable to a conventional vehicle that does not include the BISG.

Figure 2:
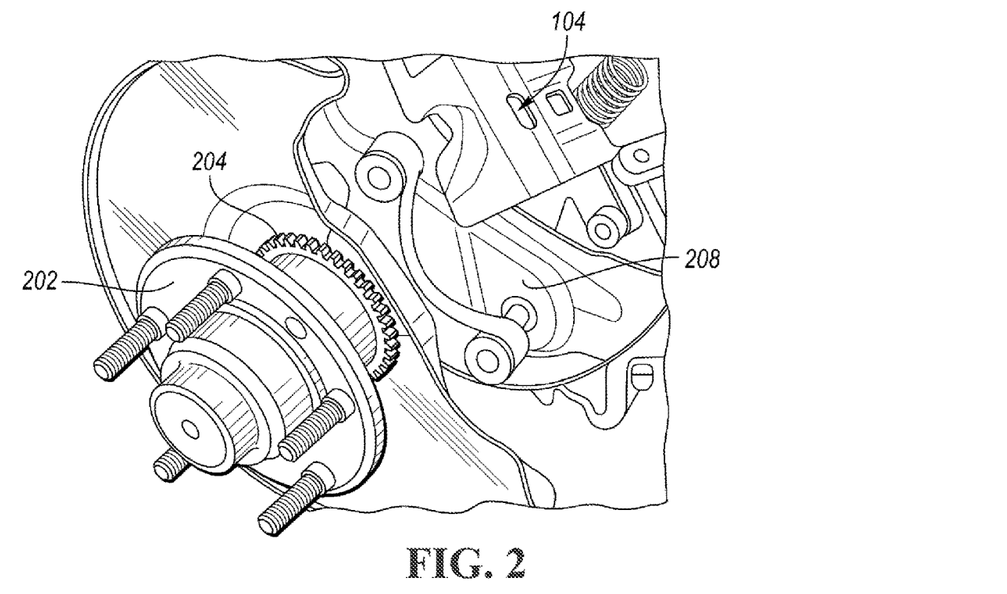
FIG. 2 is an enlarged view of an example brake assembly of the example vehicle of FIG. 1.

FIG. 2 is an enlarged view of an example brake assembly 104 of vehicle of FIG. 1. The example brake assembly 104 includes a wheel attachment support (e.g., a wheel hub) 202, a tone ring 204, brake pads (removed for clarity) and a brake caliper 208. To prevent wheel slippage, an anti-lock braking system (ABS) 52, shown in FIG. 1, is implemented in the vehicle 10. Alternatively, the vehicle may include a brake-by-wire system. Wheel speed may be measured via the tone ring 204 (or other speed sensor) to determine whether slippage is occurring at one or more of the tires 108 of the vehicle 10 and/or whether the vehicle 10 is skidding. As a result, the ABS 52 may control brakes (e.g., modulate one or more of the brakes) based on the slippage to prevent locking of the wheel 102. In contrast, and as will be discussed below, the examples disclosed herein employ the ABS 52 (or other braking control system) in an opposite and counterintuitive manner from typical ABS functionality to enable locking and/or significant braking of the wheels 22 during a controlled driving maneuver that intentionally induces tire slippage, such as drifting, for example. In other words, the examples disclosed herein can be directed to locking wheels, which is a counterintuitive use of an ABS, but advantageous for performance vehicle maneuvering on a closed-course setting.

According to the illustrated example of FIG. 1, the ABS 52 communicates with the vehicle controller 50 and also directs braking of the brake assemblies 104 by causing intermittent or pulsating engagement of respective brake pads associated with the brake assemblies 104 to prevent further slippage of the wheels 22, 23 when sensors associated with the ABS 52 and/or the vehicle controller 50 detect wheel slippage. The example ABS 52 is also used to lock at least one of the wheels 22 during a driving maneuver when the vehicle 10 is operated in a drift mode.

Figure 3:
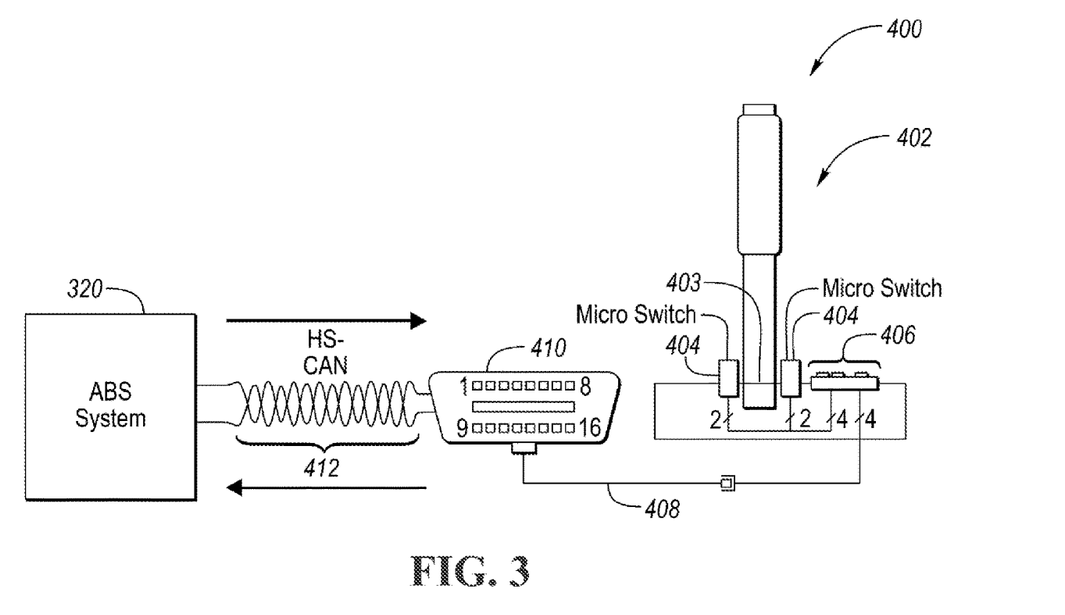
FIG. 3 is an example human-machine interface for operating a drift mode of the vehicle.

Referring to FIG. 3, the drift mode may be initiated by a driver of the vehicle through a human-machine interface (HMI). The HMI may be a lever, a button, a touch screen, a voice command, etc. In one embodiment, a hand-operated lever (drift-stick) 402 is provided in the cabin. The lever 402 is communicatively coupled to the ABS 52. The lever 402 has a corresponding axis of rotation 403, positional sensors (e.g., micro-switches, angular rotation sensors, etc.) 404 and indicators 406, which are implemented as color-coded LEDs in this example. The example performance brake system 400 also includes a communication line 408, which is implemented as a cable/connector assembly in this example, that communicatively couples the lever 402 and/or the micro-switches 404 to a data plug or connector 410 and, thus, a data interface 412, which is implemented as a high-speed controller-area network (CAN) in this example. The lever 402 and/or the micro-switches 404 may include a transceiver to communicate with the data interface 412.

To verify and/or determine a status of the lever 402, the ABS 52 and/or the controller 50 communicates with the lever 402 and/or the associated micro-switches 404, and receives an acknowledgement that the lever 402 and/or the micro-switches 404 are connected/coupled (e.g., in digital communication). Accordingly, the ABS 52 of the illustrated example determines that the lever 402 is assembled and/or attached for use. The lever 402 may be permanently attached or may be attached and/or assembled by a user/driver for specific driving use(s) (e.g., for recreational or performance/track driving). To enable the lever 402 to actively control the ABS 52, the vehicle controller 50 perform numerous checks and/or verification of vehicle conditions and driver selected mode inputs to enable control of the lever 402.

To control the ABS control system 52 in a drift mode, the micro-switches 404 are used to detect/measure an angle of rotation of the lever 402 about the axis of rotation 403 and provide or transmit a signal associated with the angle of rotation and/or angular position to the ABS 52 via the data interface 412. According to the illustrated example, a rotational angle of the lever 402 that moves past an angular/rotational position threshold (e.g., 15 degrees upward from horizontal/ground) causes the ABS system 52 to significantly cease rotation of (e.g., lock) at least one of the wheels (e.g., the rear wheels 22) after the aforementioned checks and/or verification have been performed to enable the ABS 52 to be controlled by the lever 402 in the performance mode. In some examples, a degree to which the lever 402 is rotated is directly/proportionally related to how much the wheels 22 are prevented from rotating by the respective brakes 104. In some examples, the clutches 25 are disengaged during drift mode (i.e., disengaging the rear wheels 22 from being provided with power/torque from the differential 20). Additionally or alternatively, an electronic stability control (ESC) system of the vehicle 10 is disabled (e.g., manually disabled by a driver) in the drift mode.

While the example communication line 408 is implemented as a cable/connector assembly in this example, the communication line 408 may be wireless (e.g., Bluetooth or Wi-Fi protocol) and/or directly coupled to the ABS 320. While the connector 410 utilizes an interface connection in this example, in other examples, the connector 410 and/or the communication line 408 may be implemented using a USB interface, SYNC® or any other appropriate protocol/interface.

Figure 4:
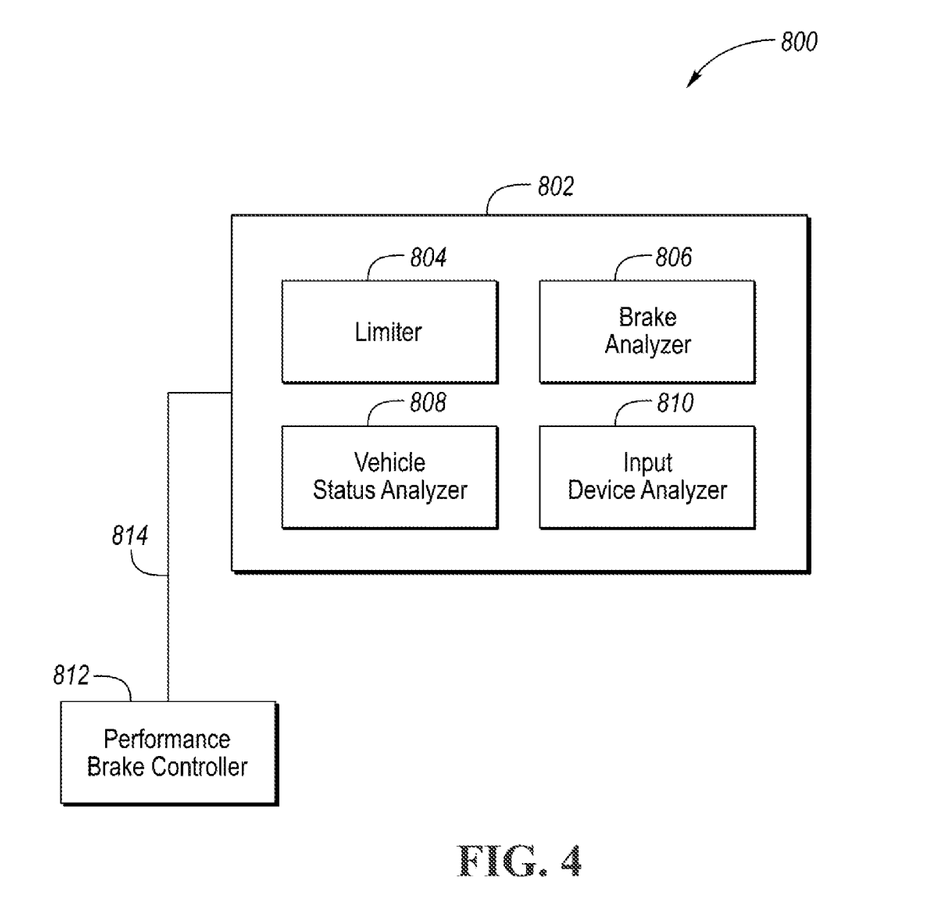
FIG. 4 is an example control system for operating the drift mode.

FIG. 4 illustrates an example performance brake control system 800 that may be used to implement the drift mode. The performance brake control system 800 may be implemented in the vehicle controller and/or the ABS controller, or any appropriate node or module of the example data interface 412. The brake control system 800 of the illustrated example includes a brake computer 802, which includes a limiter 804, a brake analyzer 806, a vehicle status analyzer 808, and an input device analyzer 810. In this example, the brake control system 800 also includes a performance brake controller 812 that is communicatively coupled to the brake computer 802 by a communication line 814.

To verify that the vehicle 100 can be placed into the drift mode, the limiter 804 of the illustrated example performs multiple checks, such as whether an electronic stability control system of the vehicle 100 is turned off, whether the lever 402 is connected/coupled, and in what mode(s) the vehicle 100 is currently set (e.g., a performance drift mode, a selected drift mode, etc.).

According to the illustrated example, the vehicle status analyzer 808 receives sensor data from the sensors to calculate a current condition of the vehicle 10. This condition can include measured vehicle speed, wheel speed, external conditions, weather, selected settings (e.g., selected vehicle mode settings), etc. Additionally or alternatively, the vehicle status analyzer 808 determines a degree of slippage of the wheels and/or whether the vehicle 10 is currently performing a maneuver (e.g., a drift maneuver).

To determine a degree of braking power to be provided to the wheels 22 by the ABS 52 based on a rotation of the lever 402, the brake analyzer 806 calculates a proportional amount of braking power to be provided to at least one of the wheels 22 by the ABS 52. Additionally or alternatively, the brake analyzer 806 determines whether to lock at least one of the wheels (e.g., the rear wheels 2) for a drift.

According to the illustrated example, the input device analyzer 810 determines or verifies a presence of the lever 402 and a degree to which the lever 402 is rotated. In some examples, the input device analyzer 810 verifies proper (e.g., accurate) operation of the lever 402 and/or the respective micro-switches 404. Additionally or alternatively, the input device analyzer 810 authenticates the lever 402 to ensure that the lever 402 is not intended for another model or produced by an unauthorized manufacturer.

The example performance brake controller 812 controls the ABS 52 when the driver provides input to the lever 402 after the limiter 804 has performed the necessary checks mentioned above. In this example, the performance brake controller 812 also disengages the clutches 25 to isolate the rear wheels 102 from the driveline 15. In some examples, the performance brake controller 812 determines which of the wheels 22 to lock and/or decouple via the clutches.

While an example manner of implementing the performance brake control system 800 is illustrated in FIG. 4, one or more of the elements, processes and/or devices illustrated in FIG. 4 may be combined, divided, re-arranged, omitted, eliminated and/or implemented in any other way. Further, the example limiter 804, the example brake analyzer 806, the example vehicle status analyzer 808, the example input device analyzer 810, the example performance brake controller 812 and/or, more generally, the example performance brake control system 800 of FIG. 4 may be implemented by hardware, software, firmware and/or any combination of hardware, software and/or firmware. Thus, for example, any of the example limiter 804, the example brake analyzer 806, the example vehicle status analyzer 808, the example input device analyzer 810, the example performance brake controller 812 and/or, more generally, the example performance brake control system 800 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, limiter 804, the example brake analyzer 806, the example vehicle status analyzer 808, the example input device analyzer 810, and/the example performance brake controller 812 is/are hereby expressly defined to include a non-transitory computer readable storage device or storage disk such as a memory, a digital versatile disk (DVD), a compact disk (CD), a Blu-ray disk, etc. including the software and/or firmware. Further still, the example performance brake control system 800 of FIG. 8 may include one or more elements, processes and/or devices in addition to, or instead of, those illustrated in FIG. 8, and/or may include more than one of any or all of the illustrated elements, processes and devices.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 5:
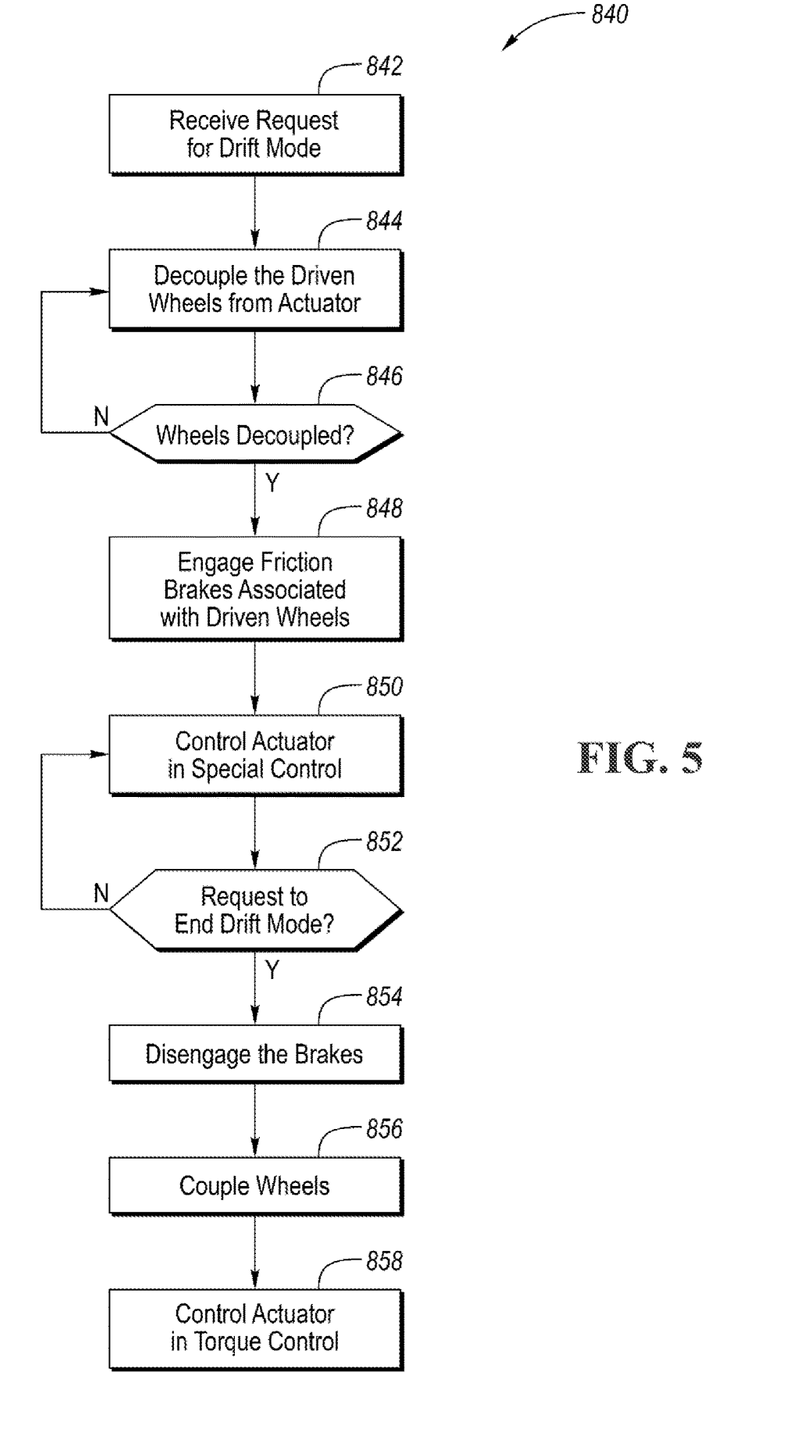
FIG. 5 is a flow chart of an algorithm for controlling the vehicle during the drift mode.

FIG. 5 is a flowchart 840 of an algorithm for controlling a vehicle during drift mode. The controls began at operation 842 where the controller receives a request for drift mode. The request may be made by the driver with the above-described lever 402 or other human-machine interface. In response to receiving the request, the controller decouples the driven wheels from the actuator associated with the driven wheels at operation 844. Depending upon the embodiment of the vehicle, this may include opening the clutches 25 for example. In alternative embodiments, the wheels may be decoupled by opening the clutch associated with the manual transmission, opening one or more clutches of an automatic transmission to decouple the input and output shaft of the transmission, actuating a center differential or a transfer case to decouple the rear wheels, de-energizing an electric machine associated with the driven wheels, etc. At operation 846, the controller monitors the wheels to determine if they have become decoupled. If no, control loops until the wheels decouple. Once the wheels decouple, control passes to operation 848 and the friction brakes associated with the driven wheels, e.g., rear wheels, are engaged to lock the wheels and create tire skidding allowing the vehicle to drift.

Figure 6:
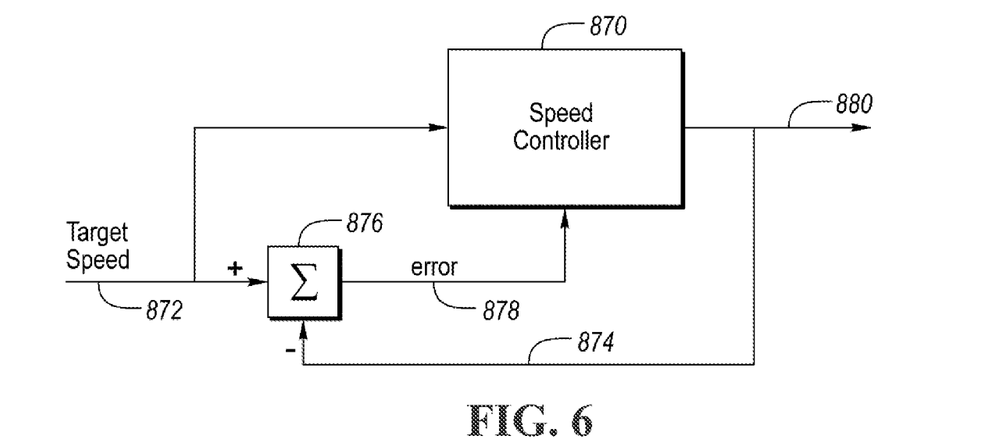
FIG. 6 is a control diagram for controlling an engine or an electric machine in speed control.

At operation 850, the controller places the actuator associated with the driven wheels in speed control during the drift. This may involve switching the actuator from torque control to speed control. Speed control is a mode in which the actuator is operated to a target speed using a PI controller, PID controller, or the like. FIG. 6 illustrates a simplified example of a speed controller. A motor speed controller 870 commands speeds and/or torques to the actuator, e.g., an engine or an electric machine, based on a target speed and an error. A feedback loop is used to adjust the speed/torque commands to reduce the error between the measured actuator speed and the target actuator speed. The target speed 872 is compared to the measured (or inferred) speed 874 at summation block 876 to determine an error 878. The error 878 is provided to the speed controller 870, which includes logic for adjusting the speed commands and/or torque commands 880 to reduce the error.

Depending upon different embodiments or sensed conditions, the target speed may be based on the speeds of the non-driven wheels (an average speed of the two wheel speeds may be used), a speed of the actuator prior to drift mode, a position of the accelerator pedal, speed ratio of the drivetrain, and the like. In one example, the actuator is controlled in speed control and the speed target is based on the speed of the non-driven wheels so that when the actuator is re-coupled to the wheels, wheel slip is minimized and a spin-up time of the actuator is reduced. Here, the speed commanded to the actuator is based on the speed of the non-driven wheels modified by the speed ratio of the drivetrain (to convert between the wheel domain and the actuator domain). For example, the target speed may be equal to the speed of the non-driven wheels multiplied by the speed ratio of the drivetrain. The speed ratio of the drivetrain takes into account the gear ratio of the transmission, the gear reduction at the rear differential, and any other speed ratios present. The speed target may be additionally modified by a modifier that may either increase or decrease the speed target from the speed of the non-driven wheels by a percentage, such as ±10 percent. In this case, the target speed may be characterized as substantially equal to the non-driven wheel speed. Used in this context, substantially equal refers to target speed being within ±10% of the non-driven wheel speed. In another embodiment, the target wheel speed may be equal or approximate the actuator speed prior to entering drift mode in response to the accelerator pedal position being within a threshold envelope of the accelerator pedal position just prior to drift mode. If the accelerator pedal deviates from this threshold envelope during the drift mode, then the speed target of the actuator may be set to one or more predetermined values. For example, the speed target may multiple predetermined values, one for when the accelerator is released outside of the threshold envelope, and another for when the accelerator pedal is depressed outside of the threshold envelope.

At operation 852, the controller determines if there has been a request to end drift mode. If yes, control passes to operation 854 where the controller disengages the brakes associated with the rear wheels. Once the brakes are disengaged, the controller couples the driven wheels to the actuator at operation 856. The action at operation 856 may be the opposite of the action at operation 844. For example, the clutch is 25 may be engaged. Once the wheels are coupled with the drivetrain, the controller switches the actuator back to torque control at operation 858.

The decoupling of the wheels at operation 846 has the potential to create a speed flare of the actuator. Furthermore, operating the actuator in speed control when decoupled from the driven wheels, provides a potential use for the power generated by the actuator, especially when the speed target is elevated. In one embodiment, the BISG (if equipped) may be operated to mitigate speed flare and to harness the usable power of the actuator during the drift mode to charge the battery. For example, during the decoupling of the driven wheels, the controller may command a negative torque (or an increased negative torque) to the BISG such that the speed of the actuator remains relatively constant to mitigate engine flare associated with the decoupling of the driven wheels. The negative torque may be commanded throughout the complete duration of the drift mode in order to harvest energy produced by the actuator, which may be operated at a relatively high speed to match the speed of the non-driven wheels in some instances. Other accessories associated with the actuator, such as a P1 or P2 electric motor, an alternator, a compressor unit, a flywheel system, etc., may also be used to absorb the power produced by the actuators during the drift mode and stored for later use.

Figure 7:
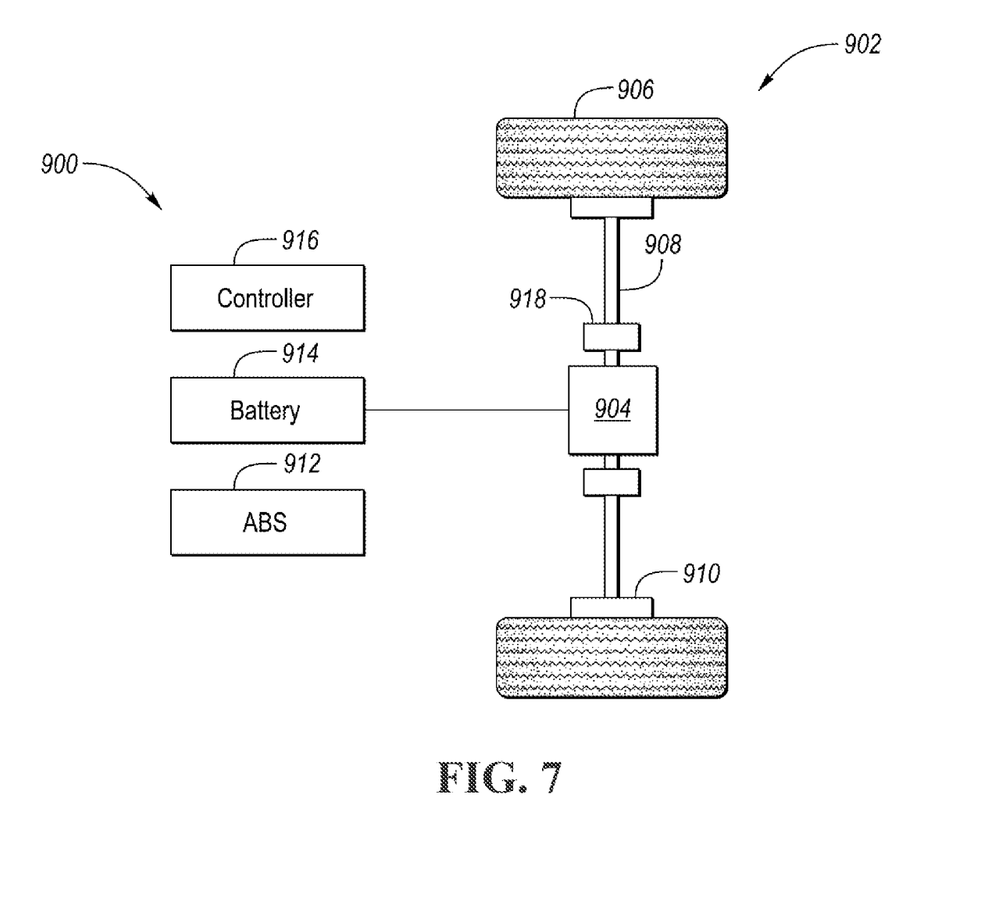
FIG. 7 is a diagrammatic view of another vehicle

While described above in the context of an engine-powered powertrain, the teachings of this disclosure are also applicable to an electric powertrain. Referring to FIG. 7, an electric vehicle 900 may include a rear axle 902 that is powered by one or more electric machines 904. The electric machine 904 may be an electric motor capable of acting as a motor to propel the vehicle and as a generator to perform regenerative braking. For example, the electric machine may be a three-phase alternating current (AC) machine. The electric machine 904 is connected to driven wheels 906 by axles 908. The friction brakes 910 associated with the driven wheels 906 are controlled by an ABS 912, which may be similar to the ABS described above.

The electric machine may be powered by one or more traction batteries, such as traction battery 914. The traction battery 914 stores energy that can be used by the electric machines. The traction battery 914 typically provides a high-voltage direct current (DC) output from one or more battery cell arrays, sometimes referred to as battery cell stacks, within the traction battery 914. The battery cell arrays include one or more battery cells. The battery cells, such as a prismatic, pouch, cylindrical, or any other type of cell, convert stored chemical energy to electrical energy. The cells may include a housing, a positive electrode (cathode), and a negative electrode (anode). An electrolyte allows ions to move between the anode and cathode during discharge, and then return during recharge. Terminals may allow current to flow out of the cell for use by the vehicle 900. Different battery pack configurations may be available to address individual vehicle variables including packaging constraints and power requirements. The battery cells may be thermally regulated with a thermal management system.

The traction battery 914 may be electrically connected to one or more power-electronics modules through one or more contactors or relays. The module may be electrically connected to the electric machines and may provide the ability to bi-directionally transfer electrical energy between the traction battery 914 and the electric machines. For example, a typical traction battery 914 may provide a DC voltage while the electric machines may require a three-phase AC voltage to function. The power-electronics module may convert the DC voltage to a three-phase AC voltage as required by the electric machines. In a regenerative mode, the power-electronics module may convert the three-phase AC voltage from the electric machines acting as generators to the DC voltage required by the traction battery 914.

The vehicle 900 includes a controller 916 that may be similar to the above-described controller 50 albeit modified to control an electric machine 904 rather than an engine. For example, the controller 916 is programmed to control the electric machine 904 in speed control during the drift mode. The rear axle 902 may include clutches 918 that are configured to decouple the wheels 906 from the electric machine 904 similar to the above-described clutches. Of course, other mechanisms may be used to decouple the wheels 906 from the electric machine 904. The teachings of this disclosure may also be applicable to hybrid powertrains that include both an engine and an electric machine(s).

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   driven wheels;
   an actuator operably coupled to the driven wheels by a drivetrain;
   a braking system including friction brakes associated with the driven wheels; and
   a controller programmed to, in response to the vehicle being in a drift mode:
   decouple the driven wheels from the actuator,
   engage the friction brakes to lockup the driven wheels, and
   place the actuator in speed control and command a torque to the actuator based on a difference between a measured speed of the actuator and a target speed of the actuator, wherein the target speed is based on speeds of the non-driven wheels.

2. The vehicle of claim 1, wherein the target speed is further based on a speed ratio of the drivetrain.

3. The vehicle of claim 2, wherein the target speed is substantially equal to the speeds of the non-driven wheel multiplied by the speed ratio of the drivetrain.

4. The vehicle of claim 2, wherein the target speed is further based on a position of an accelerator pedal.

5. The vehicle of claim 2, wherein the target speed is further based on an accelerator pedal position after activation of the drift mode when the position is within a threshold envelope of an accelerator pedal position before activation of the drift mode, and is set to a predetermined value when the position is outside the threshold envelope.

6. The vehicle of claim 1 claim 2 further comprising a lever rotatable to activate and deactivate the drift mode.

7. The vehicle of claim 6, wherein the lever includes an electric switch, and further comprising a data interface that operably couples the electric switch to the braking system.

8. The vehicle of claim 1 claim 2, wherein the controller is further programmed to, in response to the vehicle exiting drift mode:
   disengage the friction brakes,
   couple the driven wheels to the actuator, and
   place the actuator in torque control.

9. The vehicle of claim 1, wherein the actuator is an engine or an electric machine.

10. The vehicle of claim 1, wherein the braking system is an antilock braking system.

11. The vehicle of claim 1, wherein the drivetrain further includes one or more clutches that selectively couple and decouple the actuator and the driven wheels, wherein the decouple the driven wheels from the actuator includes commanding the one or more clutches to a disengaged position.

12. A vehicle comprising:
   an engine including a crankshaft;
   an electric machine including a shaft;
   a front end accessory drive (FEAD) including a tension member operably connecting the crankshaft and the shaft;
   a drivetrain operably coupling the engine to driven wheels;
   a braking system including friction brakes associated the driven wheels; and
   a controller programmed to, in response to the vehicle being in a drift mode:
   actuate the drivetrain to decouple the driven wheels from the engine,
   engage the friction brakes to lockup the driven wheels, and
   responsive to the driven wheels being decoupled from the engine, command a negative torque to the electric machine such that a speed of the engine is maintained during the decoupling.

13. The vehicle of claim 12, wherein the controller is further programmed to, command the negative torque to the electric machine for a complete duration of the drift mode.

14. The vehicle of claim 12, wherein the controller is further programmed to, in response to the vehicle being in a drift mode, place the engine in speed control and command a torque to the engine based on a difference between a measured speed of the engine and a target speed of the engine.

15. The vehicle of claim 14, wherein the target speed is based on a speed of a non-driven wheel and a speed ratio of the drivetrain.

16. The vehicle of claim 12 further comprising a human-machine interface actuatable to activate and deactivate the drift mode.

17. A method of a vehicle drift mode comprising:
   receiving a request to activate drift mode;
   in response to the request, decoupling driven wheels from an actuator;
   in response to the decoupling, engaging friction brakes associated with the driven wheels such that the driven wheels become locked up; and
   in response to the decoupling, controlling the actuator in speed control such that torque is commanded to the actuator based on a difference between a measured speed of the actuator and a target speed of the actuator, wherein the target speed is based on a speed of non-driven wheels.

18. The method of claim 17, wherein the actuator is an engine or an electric machine.

* * * * *